July 21, 1953 F. S. RUSSELL 2,646,094
RECIPROCATING SAW BLADE WITH PIERCING MEANS
Filed Oct. 6, 1949
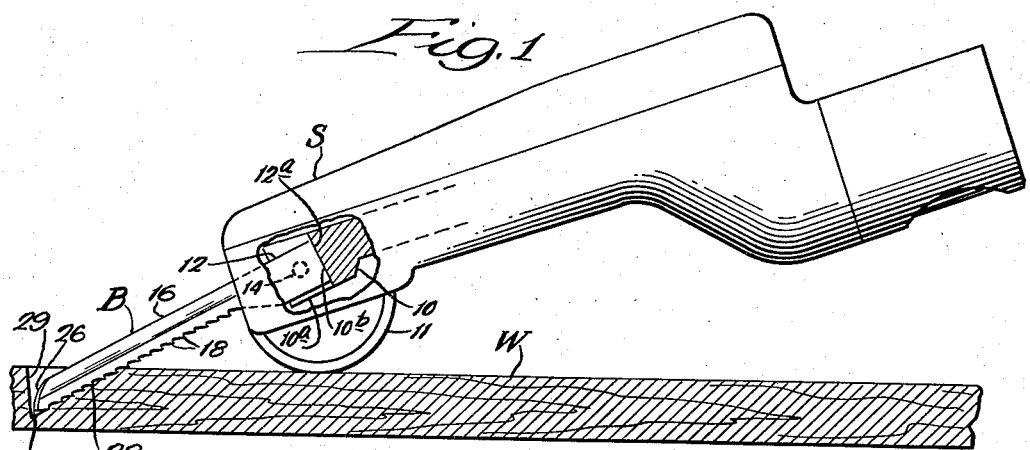
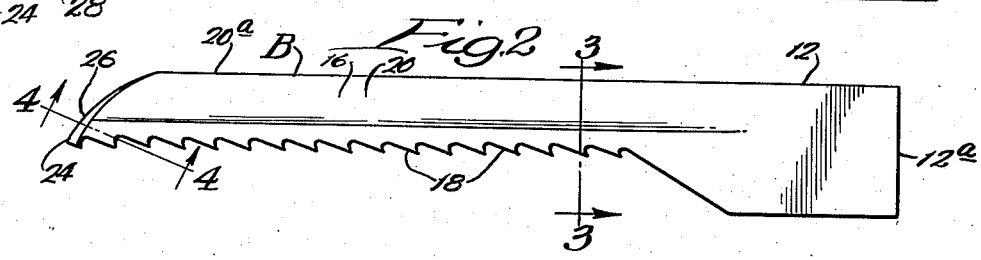
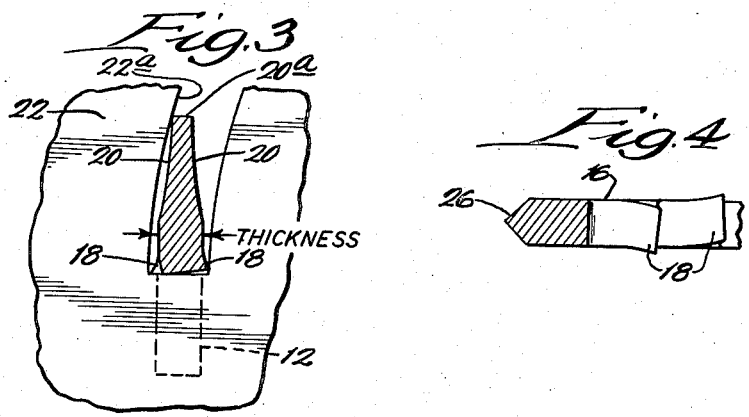
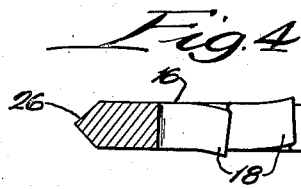
INVENTOR:
Francis S. Russell,
BY Dawson, Ooms, Booth and Spangenberg,
ATTORNEYS.

Patented July 21, 1953

2,646,094

UNITED STATES PATENT OFFICE 2,646,094

RECIPROCATING SAW BLADE WITH PIERCING MEANS

Francis S. Russell, Joliet, Ill., assignor to RCS Engineering Corporation

Application October 6, 1949, Serial No. 119,943

2 Claims. (Cl. 145—130)

My invention relates to an improved self-starting saw blade for use with a saw of the type having a reciprocating blade-receiving member.

In one type of reciprocating saw, the blade is supported at one end and the other end is free. This demands a relatively rigid or self-supporting blade capable of being propelled into and out of the work without collapsing. A thick blade must be used to achieve this rigidity, especially in the case of a scroll saw blade intended to cut arcs of short radius. The present invention relates to an improved blade that is capable of cutting into the work without an initial starting opening but is nevertheless capable of cutting arcs of short radius.

It is therefore a general object of the present invention to provide an improved self-starting saw blade.

Another object of the present invention is to provide an improved self-starting saw blade capable of cutting arcs of short radius.

The novel features which I believe to be characteristic of my invention are set forth with particularity in the appended claims. My invention itself, however, both as to its organization and method of operation may best be understood by reference to the following description taken in connection with the accompanying drawings, in which:

Figure 1 is a side elevational view of the blade of the present invention mounted in a saw and cutting into work;

Figure 2 is an enlarged side elevational view of a blade constructed in accordance with the present invention;

Figure 3 is a cross-sectional view along axis 3—3, Figure 2, showing, in addition, a work piece being cut along an arc of short radius; and Figure 4 is a cross-sectional view along axis 4—4, Figure 3.

Referring now to Figure 1, there is shown at S a saw of the type having a reciprocating member adapted to receive a blade. This member is shown in fragmentary view in the broken away portion of Figure 1 and is indicated at 10. The reciprocating member is driven in forward and backward reciprocating movements by suitable drive means (not shown). The drive may, for example, include a crank and suitable pitman to convert rotations of a motor shaft to reciprocations of member 10. The front end of the member 10 is forked at 10a to define a slot to receive the head 12 of the blade B. A set screw 14 is threadedly received in one side of the forked portion 10a and forces the blade against the other side to secure the same in place.

The saw of Figure 1 is of the type disclosed and claimed in the copending application of Arthur J. Folli, S. N. 113,932, filed August 3, 1949, entitled Reciprocating Saw Tool Attachment, assigned to the same assignee as the present invention. This saw includes a semicircular frontal tool rest or guard 11 to hold the front end of the saw in spaced relation to the surface of the work W as shown.

The blade B has a head portion 12 and a cutting portion 16 as shown in Figure 2. A plurality of longitudinally spaced teeth 18 are formed in the lower longitudinal edge of the cutting portion, adjacent teeth having opposite sets as shown in Figures 3 and 4.

The blade B is made of any suitable material. However, because of the need for rigidity, it is desirable to use Swedish steel or similar high strength material.

The head portion 12 of the blade B is enlarged and fits snugly in the slot defined by the two forked portions 10a of the bifurcated front end of the member 10. The end of the head portion 12 is cut off along the straight line 12a to mate with the front end wall defined by the forked portions 10a of member 10. This orients the blade in fixed tilt relative to the member 10 and the direction of reciprocatory motion.

In order to permit cutting about arcs of small radius, the cutting portion 16 of the blade B is made of relatively small width. This demands that the thickness of the blade be relatively great, as shown in the dimension entitled "thickness" in Figure 3.

The relatively large thickness dimension of Figure 3 tends to limit the minimum radius about which the blade can cut. In accordance with the present invention this limitation is overcome by forming the cutting portion of the blade with progressively decreasing thickness away from the cutting edge as shown by the portions 20, Figure 3. This may, for example, be accomplished by grinding the upper part of the cutting portion 16.

The operation of the blade in cutting an arc of small radius will be evident from Figure 3 which shows the work 22 being cut over the arc of minimum radius. As shown, the upper edge of the blade, 20a, bears against the edge 22a of the cut to tilt the blade and permit the arcuate cut.

In accordance with the present invention, the blade not only cuts the work, such as wood, when extending therethrough but, in addition, cuts its own hole into the work. This is a feature of great importance, for it eliminates the separate step of drilling a pilot hole and, in addition, the size of the slot through which the blade enters the work is only equal to the cutting width of the blade. This is the smallest cut capable of accommodating the blade. In the case of a relatively thick blade, such as a scroll blade, the problem of forming a suitable hole is particularly acute because of the large hole that must be drilled if the full blade is to be accommodated.

In the blade of the present invention self-starting is achieved despite the thickness of the blade by tapering down the free end of the cutting portion to a point coincident with the toothed edge to form the point 24, Figure 2, and in addition, sharpening the tapering portion to define a frontal cutting edge 26, Figure 2. The configuration of the frontal cutting edge is shown in cross-section in Figure 4. It will be observed that the cutting edge 26 has a maximum degree of sharpness at the tip and progressively lesser degrees of sharpness as the back edge 20a is approached.

When it is desired to cut a work piece W, Figure 1, the saw S is supported from the work by guard or rest 11 with the blade B extending forward to a position just above the work face. The saw S is then rocked forwardly to bring the sharpened tip 24 into engagement with the work surface. The tip thereupon strikes the work surface with successive chisel or hammer blows that cut chips from the work at the points of impact. The chips so cut permit the saw to be tilted further and eventually a relatively flat sawing face 28 is defined. As the cutting is continued, the face 28 is cut by the teeth 18 and the wall 29 cut by the successive chisel blows of the sharpened tip 24. Eventually the saw cuts through the work and may be operated in the normal fashion with the blade extending entirely through the work piece.

From the foregoing description it would seem that only the portion of the sharpened blade adjacent the teeth serves a useful purpose. Experience in operation has proven that this is not the case and that all portions of the sharpened edge 26 are effective. This is due to the inability of the user to hold the saw in fixed position and the lost motion and vibration necessarily associated with the operation of the saw. Because of these practical problems the tip of the blade does not strike the work W at a fixed point but instead strikes the work at many points over a small area. As a consequence the blade may strike at a point where no prior blow has chipped the work, with the consequence that it digs into the work to a considerable extent. With the full frontal portion of the blade sharpened, this does not cause an excessive impact but with only a portion sharpened, the impact might be intolerable.

It will be observed that the hole cut out by the self-starting action of the blade is of the same width as the effective width of the saw. Consequently no more than the necessary amount of work material is removed and no unsightly hole is formed.

In addition to acting as a chisel in the very early stages of starting a cut, the sharpened point of the blade acts as a chisel to cut a wall 29 substantially perpendicular to the work W as shown in Figure 1. This avoids the necessity of resawing the end of the cut to achieve a desired perpendicular face.

It will be observed that the cutting portion 16 of the blade B has relatively small width as compared with the effective cutting thickness. This is seen in Figure 2 where the lengthy blade dimension is relatively small as compared to the effective cutting thickness or the thickness of the slot cut by the blade. It is desirable to have this relation of the blade dimensions to permit cutting arcs of short radii.

While I have shown and described a specific embodiment of my invention, it will of course be understood that I do not wish to be limited thereto and that by the appended claims I intend to cover all modifications and alternative constructions falling within the true spirit and scope thereof.

What I claim as new and desire to secure by Letters Patent of the United States is:

1. A saw blade comprising an elongate shaft having a bottom edge and a top edge and side walls spaced to provide a thickness of greater dimension at the bottom than at the top, means at one end for attachment of the shaft to a driving member for reciprocating the shaft longitudinally, longitudinally spaced cutting teeth in the bottom edge of the shaft forwardly of the attachment means, and a front wall tapering downwardly and forwardly from the top edge and merging with the bottom edge at the foremost portion of the shaft and in alignment with the bottom edge portion and tapering forwardly from the side walls to a line intermediate the walls in the downwardly tapering portion to form a frontal cutting edge for removal of material during reciprocation.

2. A saw blade comprising an elongate shaft having a bottom edge and a top edge and side walls in spaced apart relation from bottom to top, means at one end of the shaft for attachment of the shaft to a driving member for reciprocating the shaft longitudinally, longitudinally spaced cutting teeth in the bottom edge of the shaft forwardly of the attachment, and a front wall tapering downwardly and forwardly from the top edge and merging with the bottom edge at the foremost portion of the shaft and in alignment with the bottom edge and tapering forwardly from the side walls at varying angle to provide a line intermediate the side walls of decreasing sharpness from the bottom wall toward the top wall to form a frontal cutting edge for displacement of material during reciprocation.

FRANCIS S. RUSSELL.

References Cited in the file of this patent

UNITED STATES PATENTS

| Number | Name | Date |
|---|---|---|
| 134,882 | Hardenbergh | Jan. 14, 1873 |
| 403,031 | Beckwith | May 7, 1889 |
| 942,920 | Martin | Dec. 14, 1909 |
| 1,567,341 | Swanson | Dec. 29, 1925 |
| 2,422,221 | Candland | June 17, 1947 |
| 2,621,685 | Butz | Dec. 16, 1952 |